United States Patent
Eden et al.

(10) Patent No.: US 11,215,098 B2
(45) Date of Patent: Jan. 4, 2022

(54) METHOD AND APPARATUS FOR A SELECTIVE CATALYTIC REDUCTION SYSTEM

(71) Applicant: Perkins Engines Company LTD, Peterborough (GB)

(72) Inventors: Alexis Eden, Thrapston (GB); Leo Shead, Stamford (GB); Ronald Silver, Peoria, IL (US); Ben Reid, Shoreham-by-Sea (GB); Graham Hargrave, Loughborough (GB); Paul Gaynor, Loughborough (GB); Thomas Lockyer, Leicester (GB)

(73) Assignee: Perkins Engines Company Limited, Peterborough (GB)

( * ) Notice: Subject to any disclaimer, the term of this patent is extended or adjusted under 35 U.S.C. 154(b) by 118 days.

(21) Appl. No.: 16/464,336

(22) PCT Filed: Dec. 11, 2017

(86) PCT No.: PCT/EP2017/082196
§ 371 (c)(1),
(2) Date: May 28, 2019

(87) PCT Pub. No.: WO2018/114426
PCT Pub. Date: Jun. 28, 2018

(65) Prior Publication Data
US 2021/0108545 A1 Apr. 15, 2021

(30) Foreign Application Priority Data
Dec. 21, 2016 (EP) .................................... 16205948

(51) Int. Cl.
*F01N 3/20* (2006.01)

(52) U.S. Cl.
CPC .......... *F01N 3/208* (2013.01); *F01N 2240/40* (2013.01); *F01N 2610/03* (2013.01); *F01N 2610/14* (2013.01)

(58) Field of Classification Search
CPC .. F01N 3/208; F01N 2610/14; F01N 2610/03; F01N 2240/40
See application file for complete search history.

(56) References Cited

U.S. PATENT DOCUMENTS 8,196,390 B2 * 6/2012 Lueders ................ F01N 11/002
60/286
10,337,381 B2 * 7/2019 Stenfeldt ............... F01N 3/2896
(Continued)

FOREIGN PATENT DOCUMENTS

CN 101443095 1/2013
CN 101462023 5/2013
(Continued)

OTHER PUBLICATIONS

International Search Report for Application No. PCT/EP2017/082196, reported on Mar. 2, 2018.

*Primary Examiner* — Matthew T Largi
(74) *Attorney, Agent, or Firm* — von Briesen & Roper, s.c.

(57) ABSTRACT

Selective catalytic reduction (SCR) systems are known and are generally included in the exhaust systems of diesel engines in order to treat the exhaust gases of such engines. Such systems typically involve the introduction of a diesel exhaust fluid (DEF) into exhaust gas flowing in an exhaust passage of an engine. DEF dosing systems are limited by the amounts of DEF that can be delivered without deposits forming on surfaces of the aftertreatment system. An impaction device is dosed with DEF at a first rate based on a set of characteristics of the SCR system. A second set of characteristics, such as an available storage capacity for (Continued)

DEF, is determined based on a set of criteria, such as a decomposition rate of DEF. Based on the second set of characteristics, the DEF dosing rate is changed to a second rate. The dosing rate is reverted to the first rate after a second set of criteria, e.g. a lower threshold of available storage for DEF, are fulfilled.

13 Claims, 2 Drawing Sheets

(56) References Cited

U.S. PATENT DOCUMENTS

| | | | |
|---|---|---|---|
| 2003/0070424 A1* | 4/2003 | Verdegan | B01D 53/8631 60/286 |
| 2009/0107120 A1 | 4/2009 | Bruck et al. | |
| 2009/0151339 A1 | 6/2009 | Doring | |
| 2010/0024393 A1* | 2/2010 | Chi | F01N 3/106 60/276 |
| 2010/0326051 A1* | 12/2010 | Busch | F01N 11/00 60/274 |
| 2011/0067381 A1 | 3/2011 | Zimmerman et al. | |
| 2011/0239633 A1* | 10/2011 | Masaki | F01N 13/0097 60/295 |
| 2013/0052095 A1* | 2/2013 | Omote | F01N 3/2066 422/170 |
| 2013/0118157 A1* | 5/2013 | Kruse | F01N 3/2066 60/295 |
| 2013/0255235 A1* | 10/2013 | Hodgson | F01N 3/103 60/287 |
| 2013/0287669 A1 | 10/2013 | Sun et al. | |
| 2017/0292430 A1* | 10/2017 | Clayton, Jr. | B01D 53/9495 |
| 2019/0316503 A1* | 10/2019 | Shead | F01N 3/2066 |

FOREIGN PATENT DOCUMENTS

| | | |
|---|---|---|
| CN | 101979847 | 12/2013 |
| CN | 103906903 | 7/2014 |
| CN | 102844534 | 9/2015 |
| CN | 105626215 | 6/2016 |
| DE | 102006023145 A1 | 11/2007 |
| EP | 2075050 A2 | 7/2009 |
| GB | 2383548 | 7/2003 |
| JP | 2015074982 | 4/2015 |
| JP | 2016037893 | 3/2016 |
| JP | 2016043320 | 4/2016 |
| WO | WO 2011120838 A1 | 10/2011 |

* cited by examiner

METHOD AND APPARATUS FOR A SELECTIVE CATALYTIC REDUCTION SYSTEM

CROSS-REFERENCE TO RELATED APPLICATION

This Application is a 35 USC § 371 US National Stage filing of International Application No. PCT/EP2017/082196 filed on Dec. 11, 2017 which claims priority under the Paris Convention to European Patent Application No. 16205948.9 filed Dec. 21, 2016.

FIELD

The present invention relates to selective catalytic reduction (SCR) systems for treating exhaust gasses. In particular, the present invention relates to methods improving efficiency of SCR systems.

BACKGROUND

Selective catalytic reduction (SCR) systems are known and are generally included in the exhaust systems of diesel engines in order to treat the exhaust gases of such engines. Such systems involve the introduction a diesel exhaust fluid (DEF) into exhaust gas flowing in an exhaust passage of an engine. The DEF contains urea which undergoes a hydrolysis and/or thermolysis within the exhaust passage whereby ammonia is produced. The ammonia passes into a SCR catalyst where it reacts with the exhaust gas, wherein any nitrogen oxides ($NO_x$) present in the exhaust gas are converted to nitrogen and water before passing out of the exhaust into the atmosphere.

A number of SCR systems which dose DEF into the exhaust passage have been proposed. Such systems are sometimes referred to as "wet spray" systems and inject a spray of aqueous urea into the exhaust gas where it decomposes to form ammonia. An example of such a system is shown in US2008307967A1. US'967 discloses an arrangement in which DEF is hydrolysed in a supply passage which is outside of a main exhaust passage. Specifically, DEF is dosed onto a hydrolysis catalyst and hydrolysed to ammonia. The ammonia flows downstream to an inlet of a SCR catalyst where it acts to reduce $NO_x$. Generally, a known control process followed by a SCR system such as the one disclosed in US'967 involves dosing the hydrolysis reactor with DEF when ammonia is required to reduce $NO_x$.

When dosing DEF onto an impaction device (e.g. a hydrolysis catalyst) in a SCR system, under certain conditions the DEF cools the impaction device sufficiently to either slow down or effectively prevent thermolysis of urea and subsequent hydrolysis of isocyanic acid, and desorption of ammonia and the isocyanic acid. This suppression of ammonia release creates a lag or delay in the function of the impaction device. This limits the amount of control which can be exerted over ammonia storage in the SCR catalyst, and NOx conversion. Furthermore, the slowed or prevented thermolysis of urea can also lead to urea deposits forming in the exhaust passage, and unreacted urea or ammonia passing untreated out of the exhaust passage in an ammonia slip event if, for example, an exhaust inlet temperature rise occurs.

To prevent deposits from forming, the DEF dosing rate onto a impaction device is typically set to a level that is equal to or smaller than the decomposition rate of DEF at a given exhaust condition (also referred to as "steady state", "safe" or "stable" dosing rate). However, using a "safe" dosing rate does not fully utilise the DEF storage capacity of the impaction device, thereby effectively limiting the production of ammonia.

It is an object of the present disclosure to at least address some of the above problems.

SUMMARY

According to a first aspect of the invention, there is provided a method for a catalytic system comprising a hydrolysis catalyst, comprising:
  dosing an impaction device with Diesel Exhaust Fluid (DEF) at a first rate based on a first set of characteristics;
  determining a second set of characteristics of the impaction device based on a first set of criteria;
  changing the dosing rate to a second rate based on the second set of characteristics; and
  reverting the dosing rate to the first rate based on a second set of criteria.

According to a second aspect of the invention, there is provided a selective catalytic reduction system for treating exhaust gas in an exhaust passage, the system comprising:
  an impaction device;
  a DEF dosing unit configured to inject DEF onto the impaction device; and
  a controller configured to carry out a method as set out above.

According to a third aspect of the invention, there is provided a computer program product containing one or more sequences of machine-readable instructions for performing a method as set out above.

Further aspects, features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Before describing specific embodiments of the invention in detail, it is instructive to present an example environment in which embodiments of the present invention may be implemented.

Figure 1:
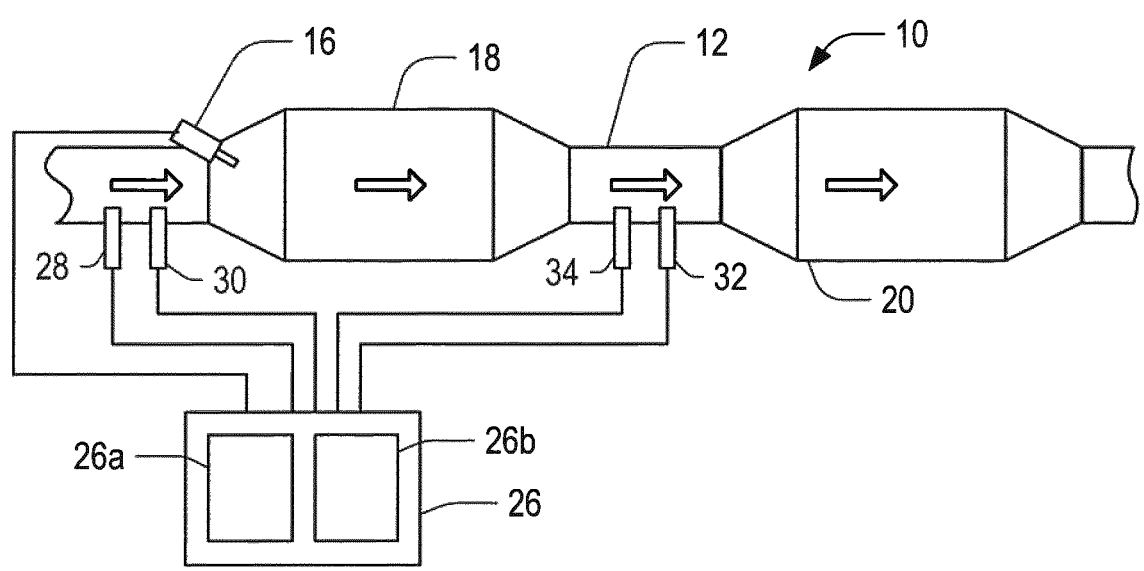
FIG. 1 shows a selective catalytic reduction system.

FIG. 1 shows an exemplary selective catalytic reduction (SCR) system 10. The system is located in an exhaust passage 12 that conveys exhaust gas away from an engine of a vehicle (not shown). Initially, the exhaust gas passes through a diesel oxidation catalyst (DOC, not shown) of a known type, which catalyses an oxidation reaction of hydrocarbons, nitrogen monoxide and carbon monoxide in the exhaust gas to produce carbon dioxide, nitrogen dioxide and water.

Downstream of the DOC is located a diesel exhaust fluid (DEF) dosing unit 16 that is configured to inject DEF onto an impaction device (e.g. a hydrolysis catalyst) 18.

Both the DEF dosing unit and the impaction device are of known types. Located downstream of the impaction device is a SCR catalyst 20 of a known type. It will be appreciated that the system 10 may comprise additional components, such as an ammonia slip catalyst.

The system includes a controller 26 that is in communication with the DEF dosing unit, and is configured to control a rate at which the DEF dosing unit injects DEF onto the hydrolysis catalyst.

The system additionally includes a plurality of sensors in communication with the controller. Specifically, upstream of the impaction device is located a Nitrogen Oxide (NOx) sensor 28 and an inlet temperature sensor 30. Located between the impaction device and the SCR catalyst is an outlet temperature sensor 32 and an ammonia sensor 34. It will be appreciated that the above-described sensors are exemplary only, and that additional or alternative sensors may be comprised in the system. Each of the various sensor may be connected to one or more inputs and/or outputs provided on the controller. During operation, the controller regulates the DEF dosing rate based, in part, on the measurement data received from the various sensors of the system.

It should be noted that, while the catalytic system is shown as having only a single controller 26, it is in principle equally possible to utilise a plurality of interconnected controllers. Alternatively, the controller may comprise a plurality of individual sub-controllers 26a, 26b. Each of the sub-controllers may perform specific operations, e.g. the first sub-controller 26a may perform operations relating to the performance of the SCR catalyst 20 and the second sub-controller 26b may perform operations relating to the performance of the hydrolysis catalyst 18.

During normal operation, the dosing rate of DEF is controlled to meet one or more requirements. One such requirement is typically to avoid saturating the hydrolysis catalyst with DEF since this may lead to DEF deposits on the catalyst, which is undesirable as it may lead to a reduction in functionality and/or efficiency of the catalytic system. Therefore, the dosing rate is typically selected so as to result in an effective residence time of DEF on the surface of the hydrolysis catalyst that is substantially zero. The effective residence time is defined as the difference between decomposition rate of DEF on the surface of the hydrolysis catalyst and the dosing rate. When the effective residence time is zero, the decomposition rate of DEF is identical to the dosing rate.

The decomposition rate of DEF is dependent on operating conditions within the catalytic system. The operating conditions within the catalytic system are in turn dependent on the operating conditions of the engine to which the catalytic system is attached (e.g. engine load).

During operation, it can be difficult to determine the precise decomposition rate of DEF, due to the dynamic operating conditions of the catalytic system. The dosing rate is therefore typically selected so as to allow for a certain level of uncertainty. Typically, a "safe" dosing rate (which may also be referred to as "steady state" or "stable" dosing rate) is selected, so as to ensure that the dosage time is smaller than the decomposition rate of DEF at any given time. However, while this avoids saturation of the hydrolysis catalyst, using such "safe" dosing rates do not fully utilise the capacity of the hydrolysis catalyst.

In order to save on computational requirements during operation, dosing rate selection is typically performed by using a lookup table store in the controller. Dosing rates in the lookup table may be a function of any number of suitable parameters (e.g. exhaust temperature and exhaust flow rate).

In the examples disclosed, it is for clarity and ease of explanation only assumed that the engine load is constant, i.e. that the "safe" dosing rate is constant. It will be appreciated that this is for exemplary purposes only, and that, in reality, the load on an engine changes during normal operation depending on a number of factors. Similarly, the dosing rate will vary to account for the load changes.

INDUSTRIAL APPLICABILITY

Figure 2:
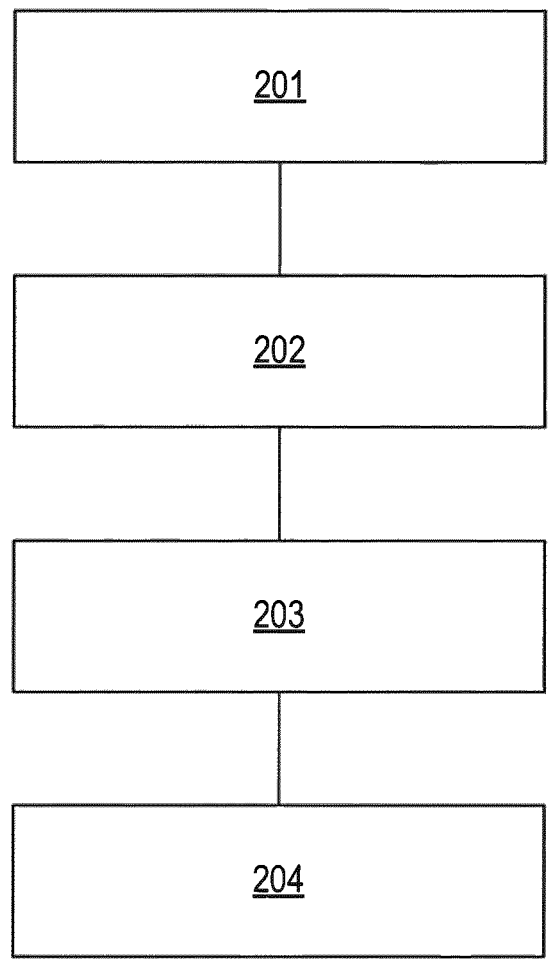
FIG. 2 illustrates a method in accordance with an embodiment of the present invention.

An exemplary method that may be implemented in the catalytic system shown in FIG. 1 will now be discussed with reference to FIGS. 2 and 3.

It will be appreciated that the exemplary method may be implemented in either or both of the controllers shown in FIG. 1. In an example, wherein the impaction device is a hydrolysis catalyst, the exemplary method is implemented in a hydrolysis catalyst controller. In another example, the exemplary method is implemented in the SCR catalyst controller. For purposes of conciseness, reference will be made in the following to a controller. It will be appreciated that this may refer to any one or several of any controllers comprised in the system (e.g., without limitation, a hydrolysis catalyst controller or a SCR catalyst controller).

In a first step 201, an impaction device is dosed with DEF at a first rate based on a first set of characteristics. This is illustrated further in FIG. 3, which shows exemplary graphs of rate of dosage 302 and an available storage capacity on an impaction device 304 as a portion of a full storage capacity 312 of the impaction device. Both the rate of dosage and available storage capacity are shown as a function of time (indicated by the X-axis 308).

Any suitable characteristics of the impaction device may be used to determine the first rate (illustrated by the horizontal line 308) as described above. In an example, the first set of characteristics comprises on one or more parameters representing a state of the exhaust system (e.g. exhaust temperature or exhaust flow rate). In another example, the first set of characteristics comprises an effective residence time of DEF (i.e. the difference between the DEF dosing rate and the decomposition time of DEF) on the surface of the impaction device.

In a specific example, the first rate 308 is chosen to ensure that the effective residence time of DEF on the surface of the impaction device is substantially zero. In other terms, the dosing rate is set at a level that is substantially identical to the decomposition rate of DEF during normal operation of an engine to which the catalyst system is attached. By keeping the effective residence time at substantially zero, formation of DEF deposits is prevented, as is explained in more detail above. As the effective residence time is substantially zero, the impaction device will have a substantially constant amount of available storage capacity 310. In other examples, the first rate may be chosen to ensure that it is lower than the decomposition rate of DEF.

Figure 3:
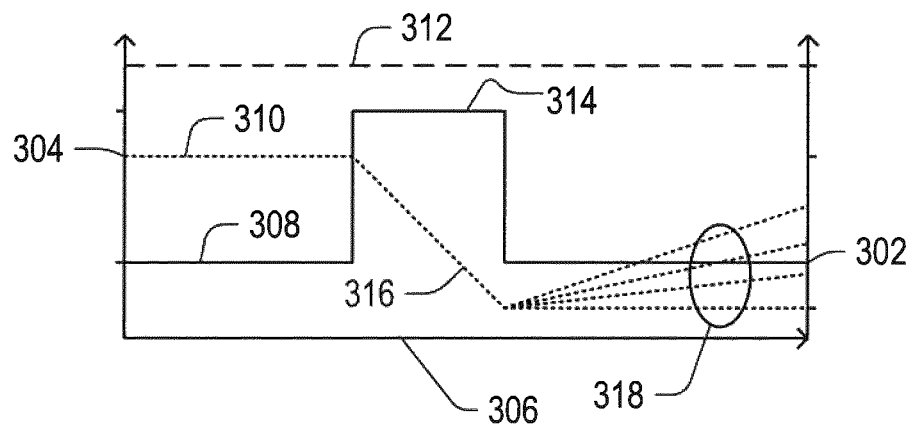
FIG. 3 shows a schematic depiction of the method illustrated in FIG. 2.

It will be appreciated that, while the dosing rate and the amount of valuable storage are shown as constant in FIG. 3, this is for exemplary purposes only and to serve to illustrate the principles of the present method. It will be readily apparent that, during normal operation of an engine (such as e.g. found on a heavy goods vehicle), it will be subject to dynamic changes in operating conditions. As such, the dosing rate may, in reality, vary.

The first set of characteristics may be implemented in any suitable fashion. In some examples, the first set of characteristics may be implemented as a lookup table embedded in the controller. Based on one or several specific factors (e.g. sensor inputs from one or more sensors located in the exhaust system), a particular entry in the lookup table may be selected. In other examples, the first set of characteristics may be derived by the controller. The first set of characteristics may be derived continuously or at set intervals.

In a second step 202, a second set of characteristics of the impaction device is determined based on a first set of criteria. The second set of characteristics may be determined at any suitable time or suitable number of times. In some examples, the second set of characteristics are determined continuously. In other examples, the second set of characteristics are determined at specific intervals as is practicable given limitations of the controller hardware.

The second set of characteristics may represent any suitable characteristic or characteristics of the impaction device. In one example, the second set of characteristics comprises an available storage capacity for storing DEF on the surface of the impaction device. As the first dosing rate is typically chosen so as to avoid saturation of the impaction device, there will under normal circumstances be a non-zero amount of available storage capacity.

The second set of characteristics may be determined in any suitable fashion, based on any suitable number of criteria. In one example, the first set of criteria comprises a decomposition rate of DEF at a specific state of the exhaust system and an initial storage capacity of the impaction device. Typically, the initial storage capacity is equal to the full storage capacity 312 of the impaction device, i.e. the storage capacity of the impaction device when not in use. It will be appreciated that this first set of criteria is exemplary only, and that, in principle, the first set of criteria could comprise additional r alternative specific criteria. In some examples, the first set of criteria additionally or alternative comprises, without limitation, one or more of: the DEF dosing rate; an estimated internal temperature; or an instantaneous storage capacity of the impaction device (which can e.g. be evaluated continuously based on the first set of characteristics.

The decomposition rate of DEF may be determined in any suitable fashion. For example, the decomposition rate of DEF may be implemented as a lookup table in the controller in a manner similar to that described with respect to the first set of characteristics above. Alternatively, the specific decomposition rate may be determined dynamically or at specific intervals during operation of the system.

The initial storage capacity may be determined in a suitable fashion. In one example, the initial storage capacity may be stored as a predetermined parameter in the memory of the controller. In some specific examples, the initial storage capacity is determined during trials or testing of the catalytic system and subsequently stored in the memory of the controller.

In a third step 203, the dosing rate is changed to a second rate 314 based on the second set of characteristics. In some examples, the dosing rate is changed based on a determination that at least one of the set of second characteristics meets a specific requirement (e.g. the dosing rate is changed to the second rate when a threshold of available storage is reached).

The second rate may have any suitable value and may be selected in any suitable fashion. In some examples the second rate may have a predetermined value, e.g. a maximum possible dosing rate of the system or a fixed percentage of a maximum possible dosing rate. In other examples, value for the second rate may be determined in a suitable fashion. In one example, the step of changing the dosing rate comprises determining a value for the second rate based on the first set of criteria.

In an example, the second rate is larger than the first rate, and is larger than the decomposition rate of DEF. Accordingly, the amount of available storage capacity decreases 316 while the impaction device is dosed at the second rate.

In certain examples, a dosage time period during which the impaction device is to be dosed at the second rate is determined in addition to the second rate. In one example, the step of changing the dosing rate to a second rate further comprises determining a dosage time period for dosing the impaction device at the second rate.

It will be appreciated that the second dosing rate and the dosage time period are inter-related, and that the specific values utilized for any given situation are dependent on situational factors. For example, it may under certain circumstances be beneficial to fill up the impaction device in as short a time as possible. In such a situation, the second dosing rate is chosen to be as high as possible, and the dosage time period to be as short as possible. Under other circumstances, it may be acceptable or preferable for the dosage time period to be longer and to use a lower second dosing rate.

In a fourth step 204, the dosing rate is reverted to the first rate after a second set of criteria are fulfilled. The second set of criteria can be defined in any suitable fashion. In one example, the second set of criteria comprises a lower threshold of available storage for DEF on the surface of the impaction device. When the lower threshold is reached, the dosing rate is returned to the first rate. In a specific example, the lower threshold is set as zero available storage. In other examples, the lower threshold may be set to be 1%, 5%, 10%, or 20%. It will be appreciated that the aforementioned specific values are exemplary only, and that any suitable value may be chosen. In another example, the second set of criteria comprises the dosage time period during which the impaction device is dosed at the second dosing rate. After expiry of the dosage time period, the dosing rate is reverted to the first rate.

Once the dosing rate is reverted to the first rate, a second amount of available storage capacity 318 starts at the level reached at the end of the dosage time period wherein the impaction device is dosed at the second rate. The second amount of available storage capacity 318 may, in some examples, stay at a constant level. In other examples, the second amount of available storage capacity 318 changes once the dosing rate is reverted to the first rate. In some examples, the amount of available storage capacity increases. In a specific example, the second amount of available storage capacity 318 increases until it reaches a level similar or identical to the amount of available storage capacity 310 prior to the impaction device being dosed at the second rate. It will be appreciated that the second amount of available storage capacity is dependent on a number of factors, including (but not limited to): the first dosing rate; the amount of available storage capacity; the second amount of available storage capacity; or environmental factors.

The above descriptions above are intended to be illustrative, not limiting. Thus, it will be apparent to one skilled in the art that modifications may be made to the invention as described without departing from the scope of the claims set out below.

The invention claimed is:

1. A method for a catalytic system comprising a hydrolysis catalyst, comprising:
   dosing the hydrolysis catalyst with Diesel Exhaust Fluid (DEF) at a first rate based on a first set of characteristics;
   determining a second set of characteristics of the hydrolysis catalyst based on a first set of criteria;
   changing the first rate to a second rate based on the second set of characteristics; and
   reverting the dosing rate to the first rate based on a second set of criteria, wherein the second rate is larger than the first rate and larger than a decomposition rate of DEF on the surface of the hydrolysis catalyst.

2. The method according to claim 1, wherein the second set of characteristics comprises an available storage capacity of the hydrolysis catalyst.

3. The method according to claim 2, wherein the dosing rate is changed to the second rate when a threshold of available storage is reached.

4. The method according to claim 1, wherein the first set of criteria comprises an initial storage capacity of the hydrolysis catalyst and the decomposition rate of DEF on the surface of the hydrolysis catalyst.

5. The method according to claim 4, wherein the decomposition rate of DEF is derived based on a state of an exhaust system.

6. The method according to claim 1, wherein the step of changing the dosing rate to a second rate further comprises determining a value for the second rate based on the first set of criteria.

7. The method according to claim 1, wherein the step of changing the dosing rate to a second rate further comprises determining a dosage time period for dosing the hydrolysis catalyst at the second rate.

8. The method according to claim 1, wherein the second set of criteria comprises a lower threshold of available storage for DEF on the surface of the hydrolysis catalyst.

9. The method according to claim 1, wherein the first set of characteristics comprises an effective residence time of DEF on the surface of the hydrolysis catalyst.

10. The method according to claim 9, wherein the first rate is set so as to cause the effective residence time of DEF to be substantially zero.

11. The method according to claim 1, wherein the first set of characteristics comprises at least one of: the decomposition rate of DEF on the surface of the hydrolysis catalyst; a temperature of exhaust; and a flow rate of the exhaust.

12. A selective catalytic reduction system for treating exhaust gas in an exhaust passage, the system comprising:
    hydrolysis catalyst;
    a DEF dosing unit configured to inject DEF onto the hydrolysis catalyst; and
    a controller configured to carry out a method for the catalytic reduction system, the method comprising:
       dosing the hydrolysis catalyst with Diesel Exhaust Fluid (DEF) at a first rate based on a first set of characteristics,
       determining a second set of characteristics of the hydrolysis catalyst based on a first set of criteria,
       changing the dosing rate to a second rate based on the second set of characteristics, and
       reverting the dosing rate to the first rate based on a second set of criteria, wherein the second rate is larger than the first rate and larger than a decomposition rate of DEF on the surface of the hydrolysis catalyst.

13. A controller comprising a computer program product containing one or more sequences of machine-readable instructions for performing a method for a catalytic system, the method comprising:
    dosing a hydrolysis catalyst with Diesel Exhaust Fluid (DEF) at a first rate based on a first set of characteristics,
    determining a second set of characteristics of the hydrolysis catalyst based on a first set of criteria,
    changing the dosing rate to a second rate based on the second set of characteristics, and
    reverting the dosing rate to the first rate based on a second set of criteria,
wherein the second rate is larger than the first rate and larger than a decomposition rate of DEF on the surface of the hydrolysis catalyst.

* * * * *